(12) United States Patent
Yurgevich et al.

(10) Patent No.: US 7,066,529 B2
(45) Date of Patent: Jun. 27, 2006

(54) CARGO CARRYING CONTAINER WITH PERIPHERAL WALL STRUCTURE INCORPORATING A CORRUGATED SHEET

(75) Inventors: Howard J. Yurgevich, Chula Vista, CA (US); Sang Sig Lee, Chula Vista, CA (US)

(73) Assignee: Hyundai Translead, San Diego, CA (US)

( * ) Notice: Subject to any disclaimer, the term of this patent is extended or adjusted under 35 U.S.C. 154(b) by 7 days.

(21) Appl. No.: 10/725,072

(22) Filed: Dec. 1, 2003

(65) Prior Publication Data

US 2005/0116504 A1    Jun. 2, 2005

(51) Int. Cl.
  *B62D 25/02* (2006.01)
(52) U.S. Cl. .................................................. 296/186.1
(58) Field of Classification Search ............. 296/186.1, 296/39.1, 37.6, 191, 39.2, 100.09, 26.11, 296/57.1; 220/1.5; 277/644; 126/620; 229/199, 229/122; 52/264, 91.1, 396.01; 410/154, 410/121, 129; 105/355, 404, 423, 410
See application file for complete search history.

(56) References Cited

U.S. PATENT DOCUMENTS

| | | | | |
|---|---|---|---|---|
| 1,681,817 A | * | 8/1928 | Small | 105/410 |
| 1,832,144 A | * | 11/1931 | Small | 105/410 |
| 2,048,981 A | | 7/1936 | Bass | |
| 2,888,818 A | * | 6/1959 | Leuthesser | 52/264 |
| 2,989,157 A | | 6/1961 | Mostoller | |
| 3,393,920 A | | 7/1968 | Ehrlich | |
| 3,435,578 A | * | 4/1969 | Pearl et al. | 52/396.01 |
| 3,657,849 A | * | 4/1972 | Garton | 52/91.1 |
| 3,842,755 A | | 10/1974 | Carr | |
| 3,917,338 A | | 11/1975 | Becker | |
| 4,015,876 A | | 4/1977 | Hulverson et al. | |
| 4,017,090 A | * | 4/1977 | Cohen | 277/644 |
| 4,040,223 A | | 8/1977 | Hillstrom | |
| 4,232,612 A | * | 11/1980 | Winsor | 105/423 |
| 4,340,036 A | * | 7/1982 | Williams | 126/620 |
| 4,357,047 A | | 11/1982 | Katz | |
| 4,420,183 A | | 12/1983 | Sherma | |
| 4,546,969 A | * | 10/1985 | Wilson | 296/186.1 |
| 4,904,017 A | | 2/1990 | Ehrlich | |
| 4,940,279 A | | 7/1990 | Abott et al. | |
| 4,958,472 A | | 9/1990 | Ehrlich | |
| 5,112,099 A | | 5/1992 | Yurgevich | |
| 5,417,020 A | | 5/1995 | Dobija | |

(Continued)

FOREIGN PATENT DOCUMENTS

DE    8025306 U1    1/1981

(Continued)

*Primary Examiner*—Kiran B. Patel
(74) *Attorney, Agent, or Firm*—Wood, Phillips, Katz, Clark & Mortimer

(57) ABSTRACT

A cargo container having a floor, a front wall, and spaced side walls. The floor, front wall, and spaced side walls cooperatively bound a cargo storage space. The front and spaced side walls each have an exposed inside surface bounding the cargo storage space and an exposed outside surface. The front and spaced side walls cooperatively define a peripheral wall structure having a top and bottom. At least part of the peripheral wall structural has at least one corrugated sheet having alternating ridges and grooves. The ridges and grooves have lengths extending in a direction between the top and bottom of the peripheral wall structure. At least part of the peripheral wall structure has at least one external panel that is connected to the at least one corrugated sheet so as to define a substantial area of the exposed outside surface.

19 Claims, 15 Drawing Sheets

U.S. PATENT DOCUMENTS

| | | | |
|---|---|---|---|
| 5,507,405 A | 4/1996 | Thomas | |
| 5,509,714 A | 4/1996 | Schmidt | |
| 5,584,252 A | 12/1996 | Smith et al. | |
| 5,664,826 A | 9/1997 | Wilkens | |
| 5,860,693 A | 1/1999 | Ehrlich | |
| 5,876,089 A | 3/1999 | Ehrlich | |
| 5,934,742 A | 8/1999 | Fenton et al. | |
| 5,938,274 A | 8/1999 | Ehrlich | |
| 5,992,117 A | 11/1999 | Schmidt | |
| 5,997,076 A | 12/1999 | Ehrlich | |
| 6,003,932 A | 12/1999 | Banerjea et al. | |
| 6,010,020 A | 1/2000 | Abal | |
| 6,109,469 A * | 8/2000 | Clive-Smith | 220/1.5 |
| 6,327,828 B1 | 12/2001 | Carroll | |
| 6,412,854 B1 | 7/2002 | Ehrlich | |
| 6,578,902 B1 * | 6/2003 | Sill | 296/186.1 |
| 6,607,237 B1 | 8/2003 | Graaff et al. | |
| 2004/0239147 A1 * | 12/2004 | Fenton et al. | 296/186.1 |

FOREIGN PATENT DOCUMENTS

| | | |
|---|---|---|
| DE | 3500551 | 6/1986 |
| DE | 3732086 A1 | 4/1989 |
| DE | 4232192 A1 | 3/1994 |
| DE | 4318838 A1 | 12/1994 |
| DE | 196 12342 C1 | 7/1997 |
| DE | 2827186 C2 | 10/1998 |
| DE | 19746795 A1 | 4/1999 |
| DE | 19730095 C2 | 5/2000 |
| FR | 2373116 | 6/1978 |
| GB | 2139159 A | 11/1984 |
| WO | WO 98/10974 | 3/1998 |
| WO | WO98/38397 * | 9/1998 |
| WO | WO99/30989 * | 6/1999 |

* cited by examiner

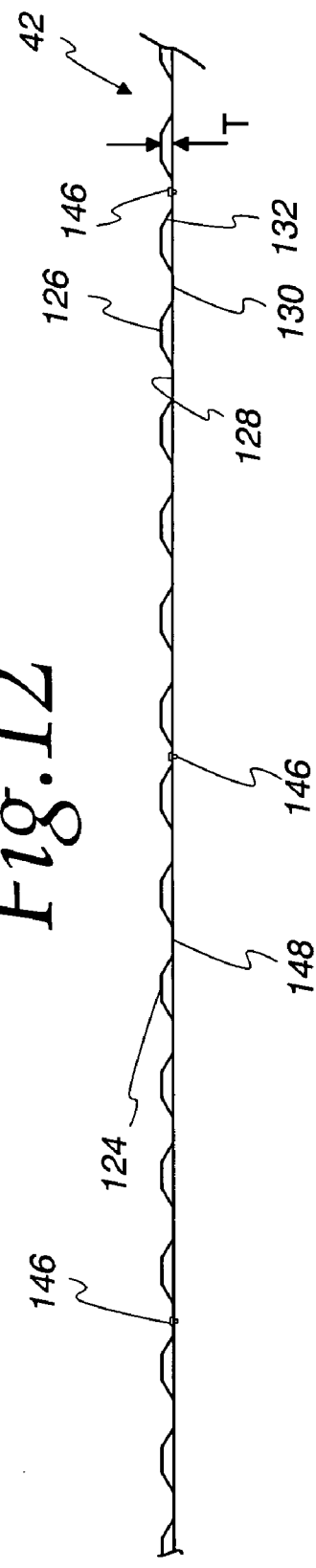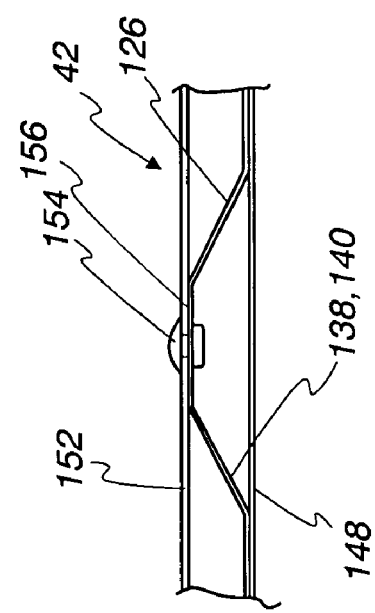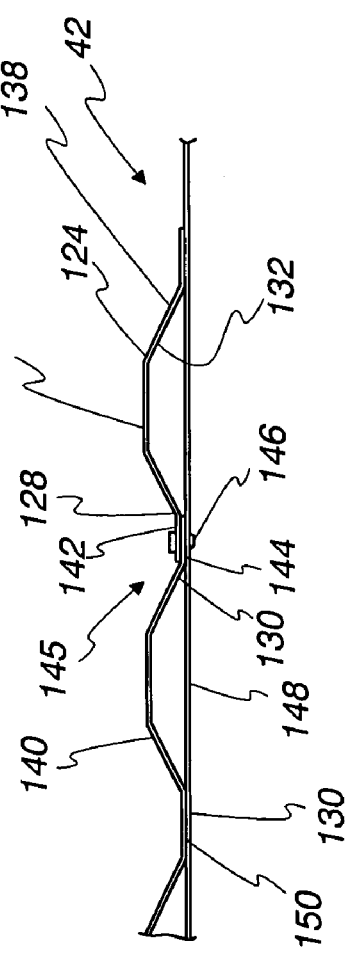

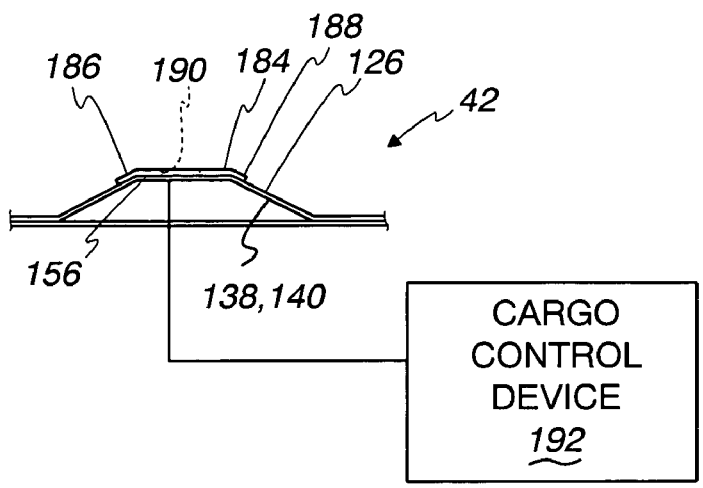
Fig.18
Fig.19
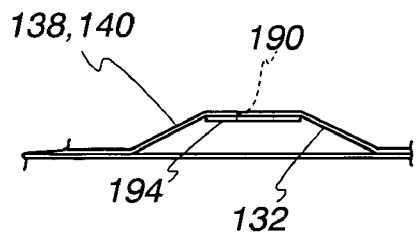
Fig.20
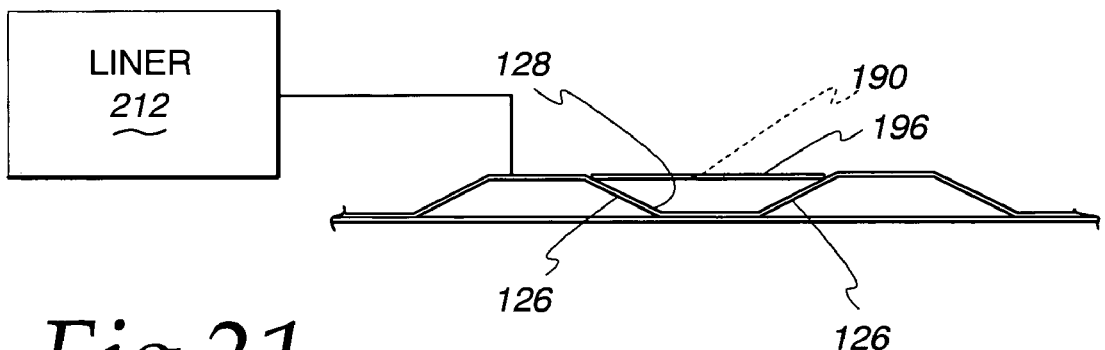
Fig.21
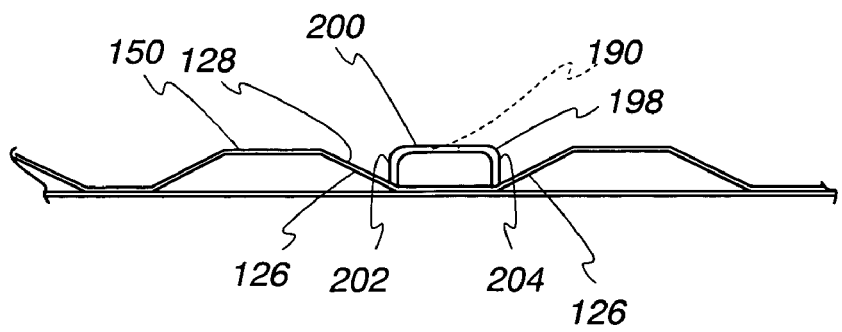

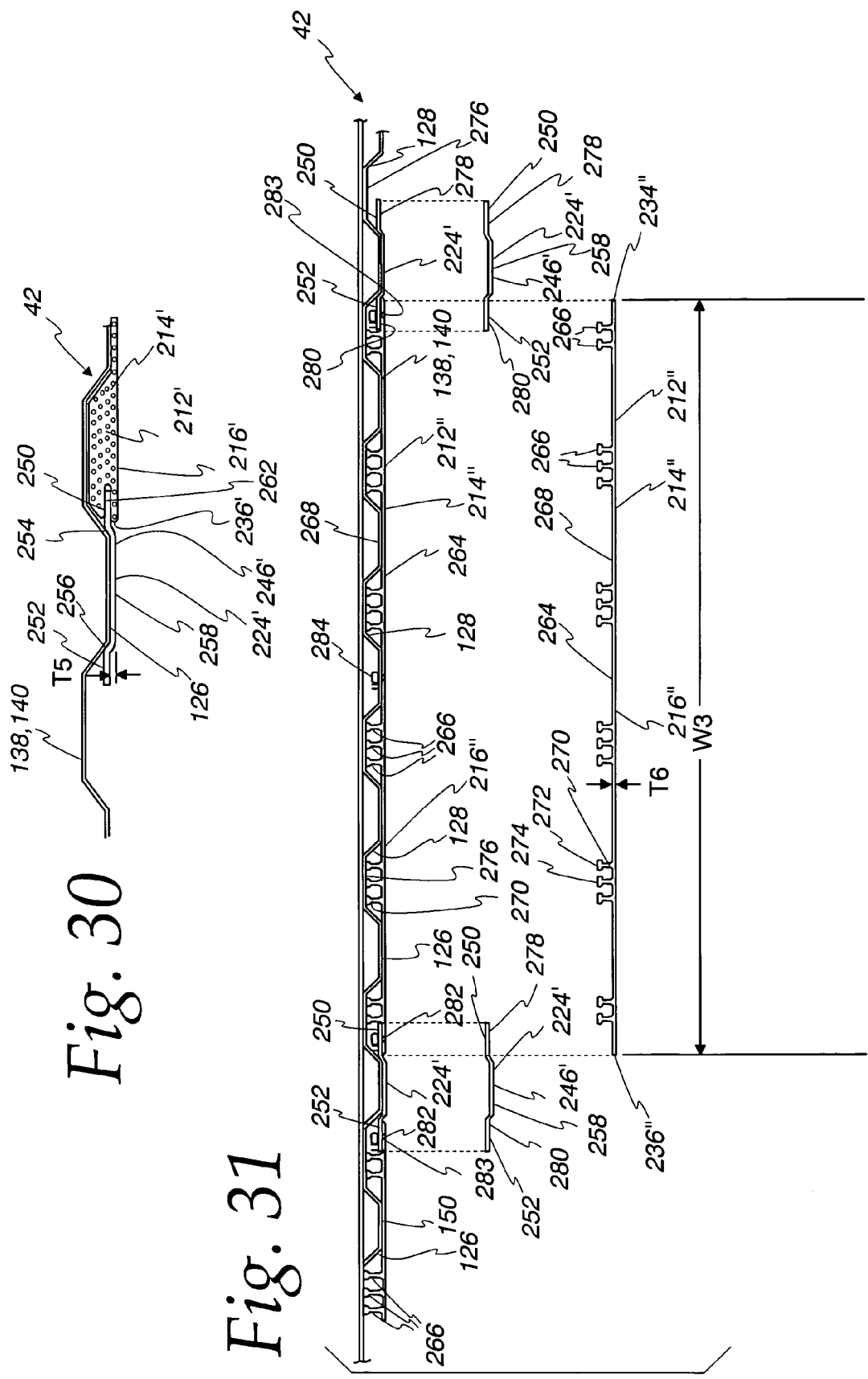

CARGO CARRYING CONTAINER WITH PERIPHERAL WALL STRUCTURE INCORPORATING A CORRUGATED SHEET

BACKGROUND OF THE INVENTION

1. Field of the Invention

This invention relates to cargo carrying containers, as used in over-the-road applications and, more particularly, to a cargo carrying container with a peripheral wall structure which extends around a cargo storage space and incorporates at least one reinforcing corrugated sheet.

2. Background Art

Myriad designs have been developed for the peripheral wall structures of cargo carrying containers, as used in single mode and multi-modal applications. Designers of these types of containers focus principally on two broad objectives. One of these objectives is to optimize the cargo space within the maximum permitted external dimensions of such containers that are permitted by the governmental agencies that regulate the trucking industry. The other objective is to produce a peripheral wall structure that will withstand vertical, transverse and lateral loading forces encountered during the normal use and operation of vehicles incorporating the cargo containers.

One common cargo container construction has front, rear, and side walls formed between upper and lower rail assemblies to cooperatively produce a cubical cargo space of desired dimensions. The upper and lower rail assemblies are respectively integrated into roof and peripheral wall assemblies and resist forces tending to bend the cargo container from its squared shape.

By reason of its weight, the roof assembly imparts a significant vertical force upon the peripheral wall structure. In a tractor/semitrailer combination, vertical loading is additionally imparted at discrete locations through a) a wheel carriage adjacent the rear of the cargo container, b) a coupler assembly at the front of the cargo container, and c) a landing gear aft of the coupler assembly that maintains a desired orientation of the cargo container relative to a support surface with the cargo container separated from a towing vehicle/tractor. Somewhat different vertical loading forces are encountered with the cargo container and towing vehicle therefor permanently integrated.

Non-vertical loading forces are imparted to the peripheral wall structure by wind, cargo shifting, and bending/distortion forces as the cargo container is transported, as through its dedicated towing vehicle in over-the-road use, or with the cargo container on rails or upon a vessel in water with multi-modal configurations. Still further, the non-vertical forces are affected by the manner in which the cargo is distributed within the storage space and secured to the peripheral wall structure to control shifting thereof.

Heretofore, it has been common to form particularly the side walls of the cargo container with vertically extending, elongate stiffeners/side posts. The stiffeners/side posts are generally made from formed steel, or other material as requirements allow or dictate, with each stiffener/side post having a generally U-shaped cross-sectional configuration, with a base, spaced parallel legs, and outturned flanges associated one each with the legs. The flanges have coplanar surfaces which are abuttable to exposed external panels which can be secured to the stiffeners/side posts, as by adhesive or mechanical fasteners. The external panels provide strength and a moisture barrier with a smooth, continuous extent that is aesthetically desirable and lends itself to the application of signage or other aesthetic or informational additions. Internal panels may optionally be attached to the stiffeners/side posts.

The stiffener/side post composition, shape, dimensions, and spacing will dictate the strength of the side walls. The depth of the stiffeners/side posts also determines in good part the degree of rigidity and ability to resist deflection under loading. Generally, the deeper the stiffeners/side posts, i.e. the longer the length of the legs, the more resistant the stiffeners/side posts are to bending. However, by increasing the depth of the stiffeners/side posts, the cargo space is correspondingly reduced. In the case of the side walls, this reduced dimension is doubled by reason of the inclusion of stiffeners/side posts at each side wall.

The stiffeners/side posts in a columnar or compressive manner absorb the vertical loads imposed on the side walls. It is sometimes necessary to add extra stiffeners/side posts in the vicinity of the wheeled carriage, the coupler assembly, and the landing gear to prevent the stiffeners/side posts from buckling in compression. Further, with a multi-modal configuration, the cargo carrying container must be loaded onto and unloaded from a rail car or ocean going vessel by means of a handling device that lifts, through normally four spaced lifting pads, which are usually 4 inches in width, by 18 inches in length. Lifting forces imparted through these pads can also create stiffener/side post failures. Thus additional stiffeners/side posts, or stiffeners/side posts of different strengths, may need to be added strategically to the side walls to handle these loads. The forces imparted at the lift areas may also vary depending upon the weight and load distribution of the cargo. This may require an increased number of stiffeners/side posts or a heavier construction for some or all of the stiffeners/side posts. Aside from detrimentally affecting the size of the cargo storage space, the heavier stiffeners/side posts represent an added expense and may also add significantly to the overall weight of the cargo carrying container. By reducing the spacing between the stiffeners/side posts, the material and labor costs associated with manufacture correspondingly increase.

Generally, designers of cargo carrying containers are forced to balance the often competing objectives of a) enhancing the integrity of the peripheral wall structure bounding the cargo space, b) reducing the overall depth of stiffeners/side posts to maximize storage volume, c) maintaining the weight of the cargo container within a certain range, and d) controlling the cost of manufacturing the cargo container.

With this conventional stiffener/side post construction, exposed internal panels may be attached, either by the use of adhesive or mechanical fasteners, or by press fitting the same in place, as disclosed in U.S. Pat. No. 6,607,237. In one form, the stiffeners/side posts are configured in cross section to define an outwardly offset edge which supports the thickness of the internal panels without causing a projection of the internal panels inwardly to beyond the base portion of the side posts. The internal panels ideally cooperatively produce a continuous flat surface, in conjunction with the side posts, to facilitate sliding of cargo against and along the walls, during loading and unloading, without hang up.

It is also known to use corrugated sheets adjacent to the bottom of the wall panels on the inside of the cargo container as scuff panels that resist damaging impacts to the stiffeners/side posts that may be imparted through loading equipment such as fork lift trucks, and also guide sliding movement of cargo thereagainst. By doing so, the dimensions of the cargo space are further reduced by the thickness of the corrugated sheets at each wall at which they are used.

It is also known to use corrugated welded steel to form exposed portions of peripheral wall structures on cargo carrying containers. This is a common construction in the ocean going trade that has resulted from decades of testing different designs, through experience in handling and through cost reduction programs. These containers are generally standardized in size and design as required for economical handling and international transportation. By using corrugated sheets, a relatively low cost container can be constructed with continuous walls which have high strength for both vertical and non-vertical loading, and which generally can be made watertight for protection of cargo on the open seas.

While this type of container has a number of advantages, both from economic and functional standpoints, there are a number of drawbacks inherent in this design. First of all, the exposed corrugated sheet material accounts for poor aerodynamic characteristics. The corrugated, exposed surface creates a significant amount of wind drag which, in an over-the-road application, may reduce fuel efficiency for the towing vehicle.

Additionally, the corrugated panels are generally unattractive and may become even more so after use. As the panels become scratched or scored in normal use, the material tends to corrode, which condition worsens over time.

Additionally, the irregular, exposed surface of the corrugated sheets does not lend itself to the application of any identifying or informational material that the user may desire.

SUMMARY OF THE INVENTION

In one form, the invention is directed to a cargo container having a floor, a front wall, and spaced side walls. The floor, front wall, and spaced side walls cooperatively bound a cargo storage space. The front and spaced side walls each have an exposed inside surface bounding the cargo storage space and an exposed outside surface. The front and spaced side walls cooperatively define a peripheral wall structure having a top and bottom. At least part of the peripheral wall structural has at least one corrugated sheet having alternating ridges and grooves. The ridges and grooves have lengths extending in a direction between the top and bottom of the peripheral wall structure. At least part of the peripheral wall structure has at least one external panel that is connected to the at least one corrugated sheet so as to define a substantial area of the exposed outside surface.

In one form, the at least one corrugated sheet extends over substantially the entire extent of at least one of the one side walls and the at least one external panel is connected to the at least one corrugated sheet to define substantially the entire exposed outside surface on the one side wall.

In one form, the at least one external panel defines a substantially continuous planar shape over substantially the entire exposed outside surface on the one side wall.

The at least one corrugated sheet may extend substantially fully between the top and bottom of the peripheral wall structure.

The at least one external panel may be connected to the at least one corrugated sheet through mechanical fasteners, an adhesive, or through other means.

In one form, the cargo container has a top rail assembly at the top of the peripheral wall structure and a bottom rail assembly at a juncture between the floor and the peripheral wall structure. The at least one corrugated sheet extends between, and is connected to, each of the top rail assembly and the bottom rail assembly.

In one form, the alternating ridges and grooves are made up of alternating internal ridges and grooves and alternating external ridges and grooves. At least one external panel bridges a plurality of external ridges and is connected to a plurality of the external ridges.

The cargo container may further have at least one internal panel that is connected to the at least one corrugated sheet to directly bound the cargo storage space.

In one form, the at least one internal panel has a continuous planar surface that directly bounds the cargo storage space.

In one form, the at least one internal panel is corrugated with alternating ridges and grooves. The alternating ridges and grooves on the at least one internal panel have lengths that are transverse to the lengths of the ridges and grooves on the at least one corrugated sheet.

In one form, the at least one corrugated sheet includes first and second corrugated sheets. The first corrugated sheet has a first edge portion with a first free edge extending generally parallel to the lengths of the ridges and grooves. The second corrugated sheet has a second edge portion with a second free edge extending generally parallel to the lengths of the ridges and grooves. The first and second free edges may be butt joined to each other. Alternatively, the first and second edge portions may be overlapped.

In one form, the at least one external panel includes first and second external panels. The first external panel has a first edge portion with a first free edge extending generally parallel to the length of the ridges and grooves. The second external panel has a second edge portion with a second free edge extending generally parallel to the lengths of the ridges and grooves. The first and second free edges may be butt joined to each other. Alternatively, the first and second edge portions may be overlapped.

The butt joined first and second free edges on the external panels may overlie an external ridge. Likewise, the overlapped first and second edge portions may overlie an external ridge.

The corrugated sheet may be made from steel, or other suitable material known to those skilled in the art.

In one form, the at least one corrugated sheet has a thickness between ¼ inch and 1½ inches.

At least one of the internal ridges may have an opening formed therein to mount a cargo control device.

A reinforcing element may be provided on the at least one internal ridge.

The cargo container may further have at least one adaptor that bridges and is connected to adjacent internal ridges.

The at least one adaptor may be in the form of a flat plate. Alternatively, the adaptor may be a U-shaped element with spaced legs that are attached, one each to adjacent internal ridges.

The at least one adaptor may have an opening formed therein to mount a cargo control device.

The first and second corrugated sheets may be connected so that a ridge on the first corrugated sheet overlaps a ridge on the second corrugated sheet.

In one form, an internal ridge on the first corrugated sheet overlaps an internal ridge on the second corrugated sheet and there is an opening through the overlapped internal ridges to mount a cargo control device.

The cargo container may be provided in combination with a powered towing component.

The powered towing component may be permanently joined to the cargo container or releasably connectable to the cargo container.

The cargo container may further include a wheeled carriage beneath the floor.

The cargo container may further have a roof which spans between the front wall and the spaced side walls.

In one form, the alternating ridges and grooves consist of alternating internal ridges and grooves. The cargo container has a liner which extends into a plurality of the internal grooves.

In one form, the liner consists of a panel with a plurality of ridges which project one each into an internal groove.

In one form, at least one of the plurality of ridges conforms to and substantially fills one of the internal grooves.

The panel may have a continuous, planar, inside surface spanning adjacent internal ridges.

The panel may alternatively have a plurality of reinforcing ribs that extend, at least one each, into a plurality of internal grooves.

BRIEF DESCRIPTION OF THE DRAWINGS

FIG. 12 is a cross-sectional view of the side wall taken along line 12—12 of FIG. 11;

FIG. 13 is an enlarged view of a portion of the side wall from the perspective of FIG. 12 and showing the connection of adjacent corrugated sheets to each other and external panels through mechanical fasteners and adhesive;

FIG. 14 is a view as in FIG. 13 and showing an optional internal panel that is connected to the corrugated sheets by mechanical fasteners;

FIG. 18 is a view as in FIGS. 13 and 17 and showing a reinforcing plate around a ridge on a corrugated sheet and having a slot/opening for accommodating a cargo control device;

FIG. 19 is a view as in FIG. 18 and showing a modified form of reinforcing plate attached to the ridge;

FIG. 20 is a view as in FIGS. 18 and 19 with an adaptor plate with slots/openings for accommodating a cargo control device and mounted between adjacent ridges on a corrugated sheet;

FIG. 21 is a view as in FIG. 20 showing a modified form of adaptor;

FIG. 30 is a view as in FIG. 28 showing the modified panel and attachment plate of FIG. 29;

FIG. 31 is a view as in FIGS. 27 and 29 of a further modified form of panel, according to the invention, and mounted using the attachment plates as shown in FIGS. 29 and 30.

DETAILED DESCRIPTION OF THE DRAWINGS

Figure 1:
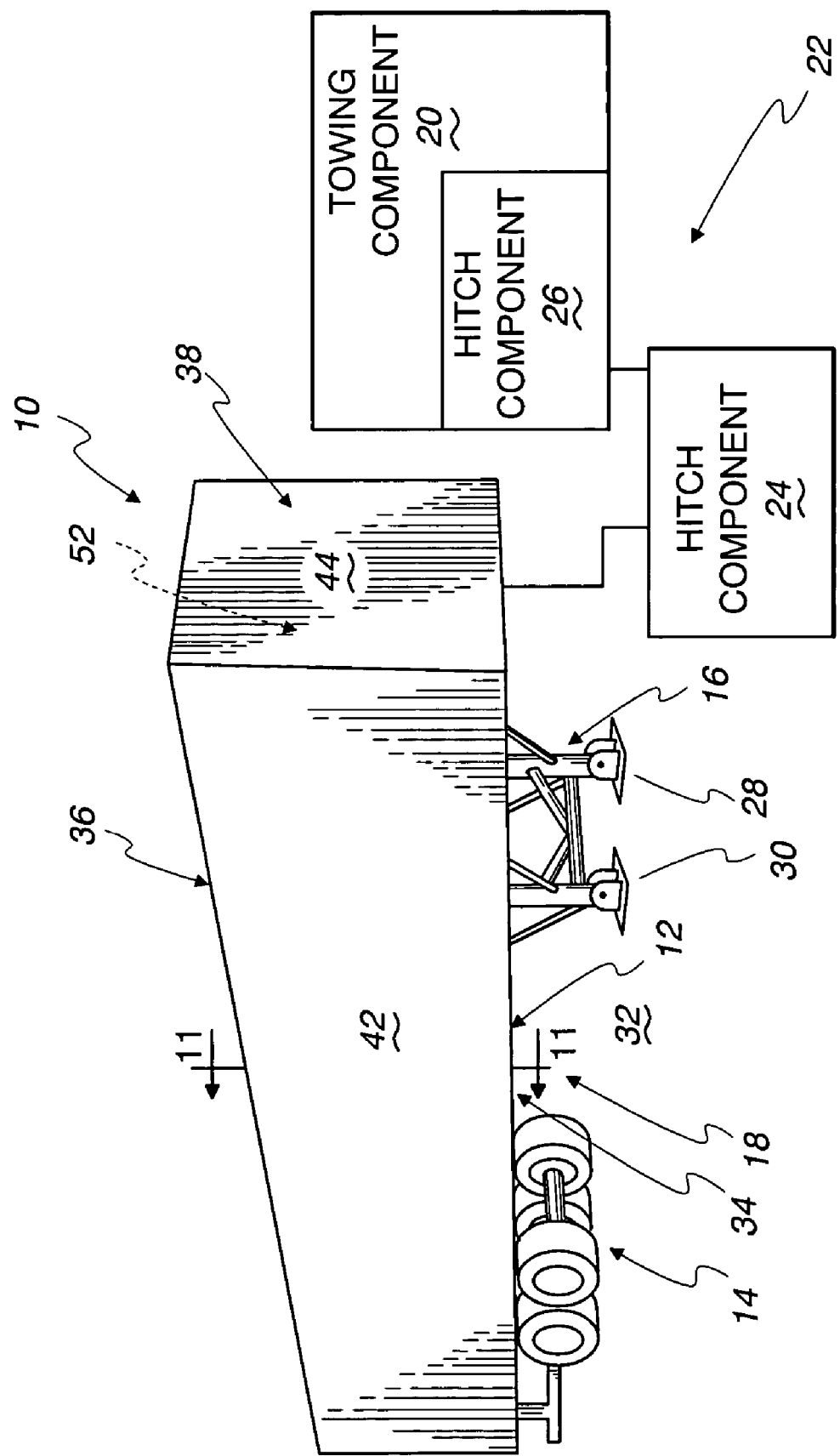
FIG. 1 is a front and side perspective view of a semi-trailer/van incorporating a cargo container with a peripheral wall assembly with at least one reinforcing corrugated sheet, and connected to a towing component depicted in schematic form, according to the present invention.
Figure 2:
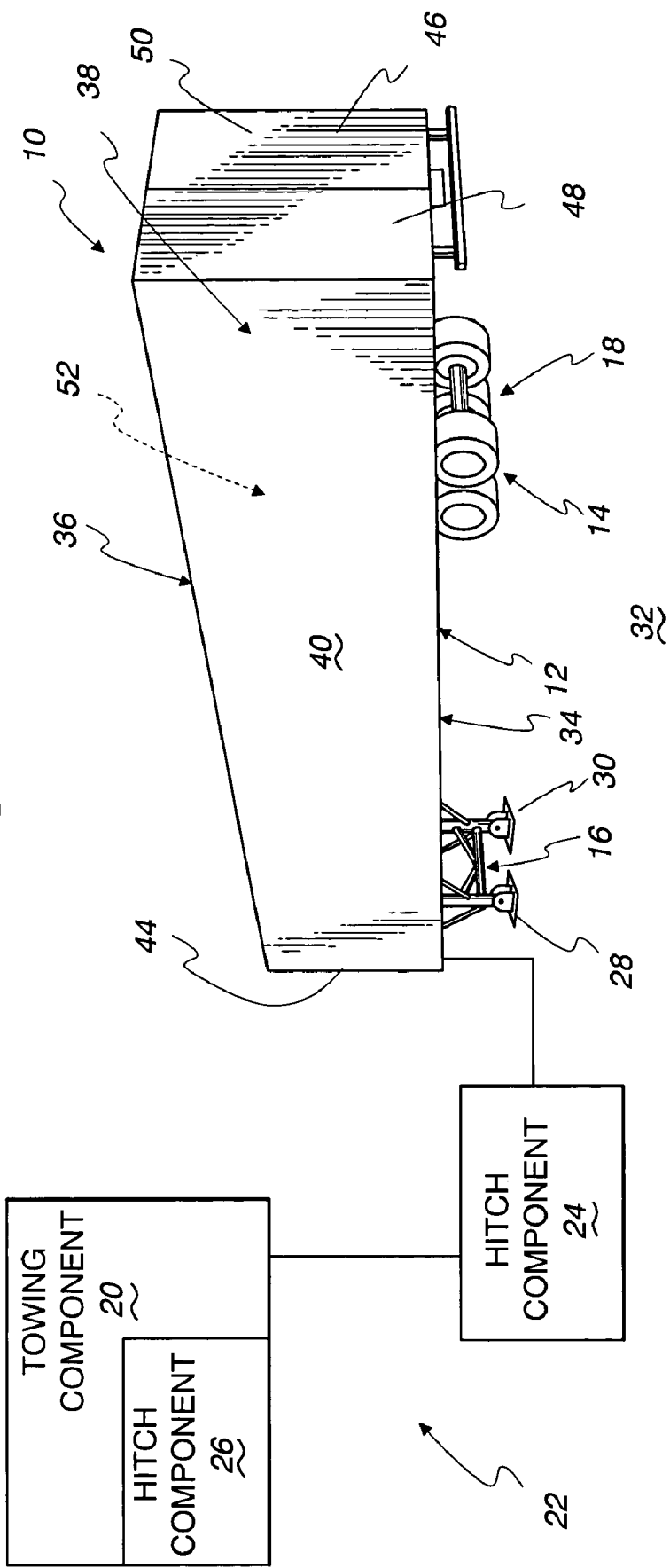
FIG. 2 is a perspective view of the semi-trailer/van and towing component in FIG. 1 taken from the rear and the side opposite that in FIG. 1.
Figure 3:
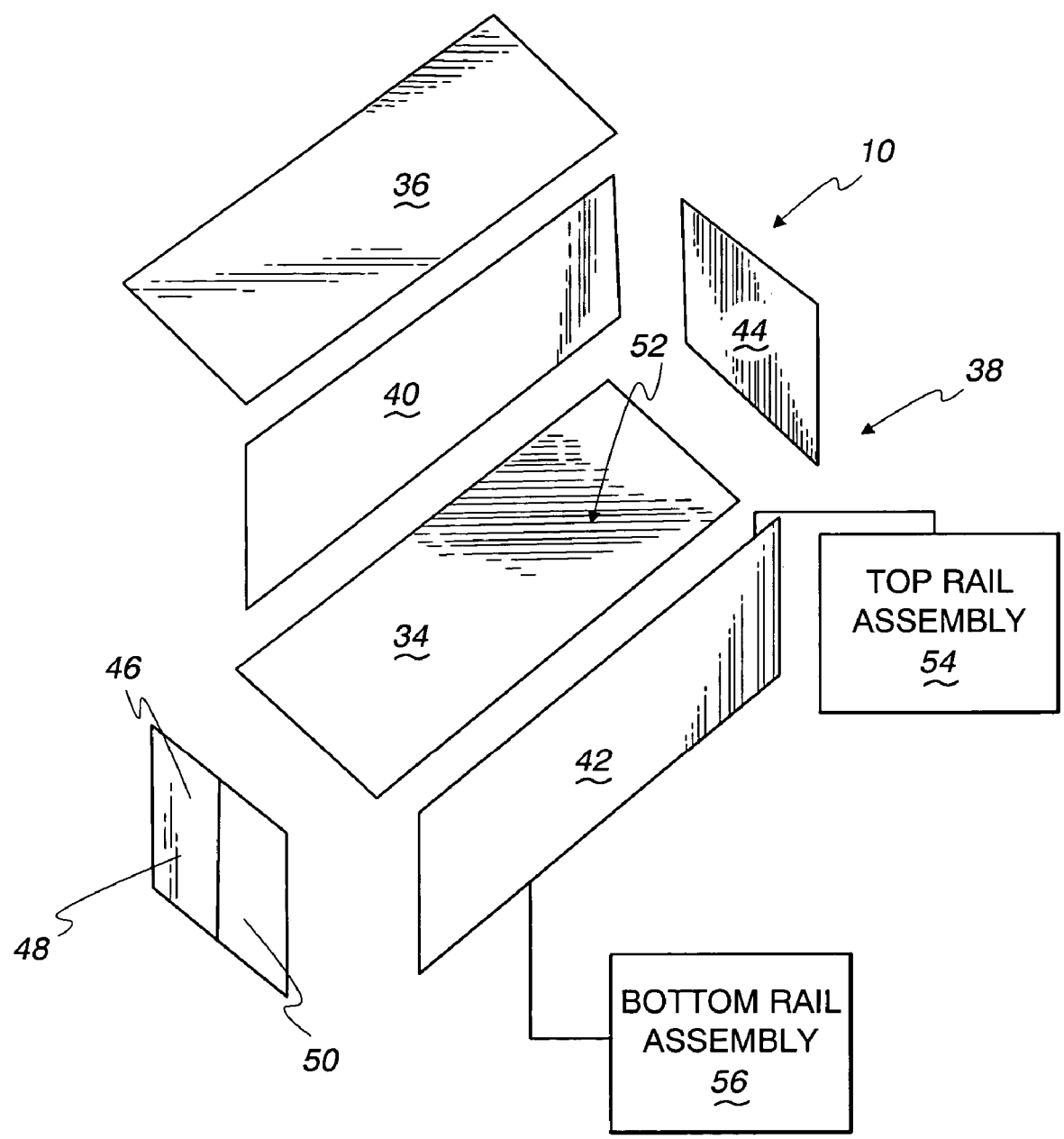
FIG. 3 is an exploded, schematic, perspective view of the cargo container on the semi-trailer/van in FIGS. 1 and 2 and showing the peripheral wall assembly constructed with spaced side walls, a front wall, and a rear wall.

Referring initially to FIGS. 1–3, one form of cargo container, according to the present invention, is shown at 10. In FIGS. 1 and 2, the cargo container 10 is integrated into a chassis 12 consisting of an aft, tandem wheel carriage at 14, and a fore landing gear at 16. The combined cargo container 10 and chassis 12, shown at 18, are commonly referred to as a semi-trailer/van.

The semi-trailer/van 18 is conventionally transported in an over-the-road application by a towing component 20, commonly referred to as a truck tractor or trailer/cab. The towing component 20 is releasably connectable to the cargo container 10 through a hitch assembly at 22, consisting of joinable hitch components 24, 26, respectively, on the semi-trailer/van 18 and towing component 20. With the semi-trailer/van 18 separated from the towing component 20, support legs 28, 30 bear on an underlying support surface 32 to maintain the semi-trailer/van 18 in the operative orientation shown in FIGS. 1 and 2.

The cargo container 10 is made up of three different assemblies: a) a floor assembly 34; b) a roof assembly 36; and c) a peripheral wall assembly 38. The peripheral wall assembly 38 in turn is defined by spaced side walls 40, 42, a front wall 44, and a rear wall 46. The rear wall 46 includes hinged doors 48, 50, which can be opened and closed to selectively permit and block access to a cargo storage space at 52, bounded cooperatively by the floor assembly 34, roof assembly 36, side walls 40, 42, front wall 44, and rear wall 46.

The exemplary side wall 42 has a top rail assembly 54 and a bottom rail assembly 56 through which the side wall 42 is connected respectively to the roof assembly 36 and floor assembly 34. Like rail assemblies (not shown) can be used to connect each of the side wall 40, front wall 44, and rear wall 46 to the roof assembly 36 and floor assembly 34. The invention herein will be described with respect to the construction of one exemplary side wall 42, with it being understood that the inventive concept can be used to make part or the entirety of the peripheral wall assembly 38 using the same inventive concept.

Figure 4:
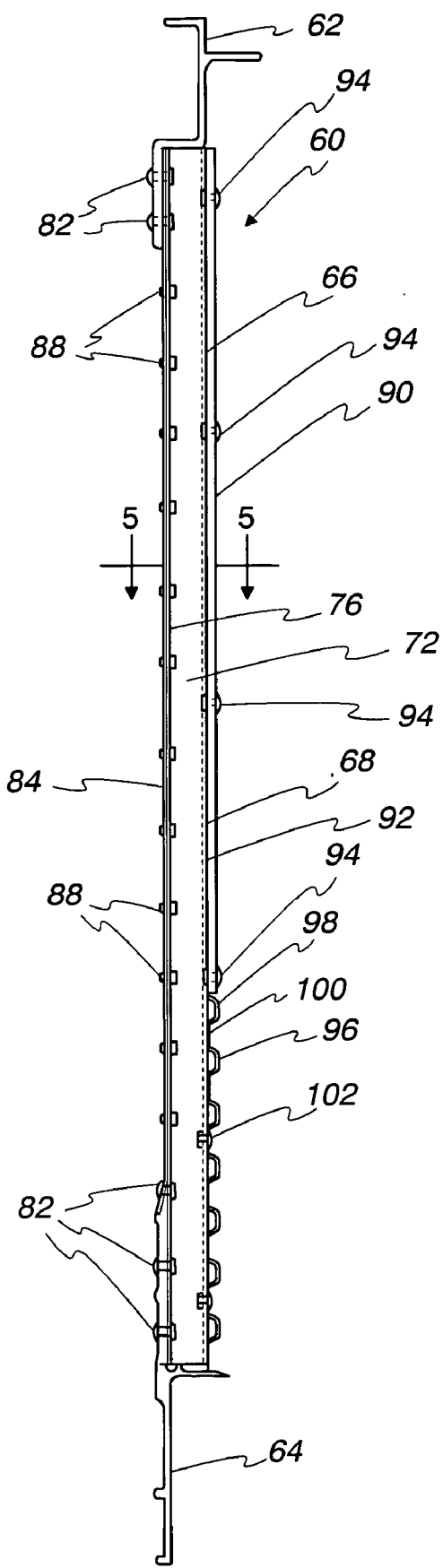
FIG. 4 is a vertical, cross-sectional view of a conventional side wall, as on a semi-trailer/van of the type shown in FIGS. 1 and 2.
Figure 5:
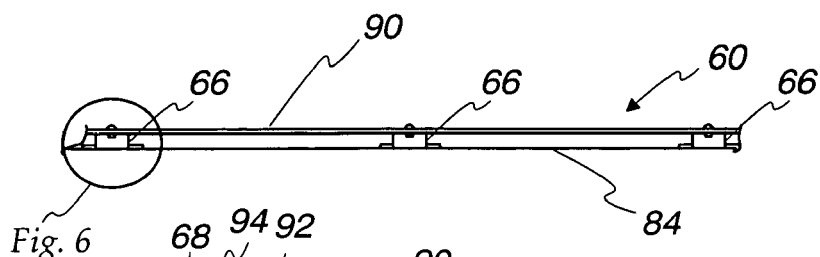
FIG. 5 is a reduced, cross-sectional view of the conventional side wall taken along line 5—5 of FIG. 4 and showing a series of stiffeners/side posts connected to internal and external panels.
Figure 6:
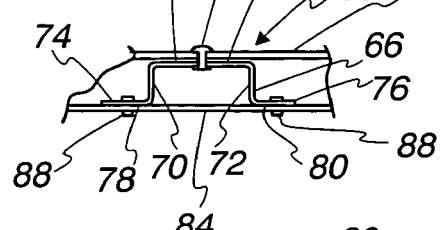
FIG. 6 is an enlarged view from the perspective of FIG. 5 and showing the connection of one of the conventional stiffeners/side posts to internal and external panels.

Referring now to FIGS. 4–6, one conventional construction for a side wall, corresponding to the side wall 42, is shown at 60. The side wall 60 has top and bottom rail assemblies 62, 64 which respectively connect the side wall 60 to roof and floor assemblies (not shown), respectively. A plurality of elongate, stiffeners/side posts 66 extend vertically between, and connect to, each of the top and bottom rail assemblies 62, 64.

In this embodiment, each stiffener/side post 66 has a U- or hat-shaped configuration with a base 68 from which spaced legs 70, 72 project. The legs 70, 72 have outturned flanges 74, 76, respectively, which have coplanar, flat surfaces 78, 80, respectively. Mechanical fasteners 82 extend through the flanges 74, 76 and each of the top rail assembly 62 and bottom rail assembly 64 to operatively connect each stiffener/side post 66 to the top rail assembly 62 and bottom rail assembly 64. As noted in the background portion herein, the spacing of the stiffeners/side posts 66 is dictated by the particular loading that is anticipated for the side wall 60.

External panels 84 are joined edge-to-edge and span the surfaces 78, 80 to define the entire external "skin" on the side wall 60. The external panels 84 are maintained in place by fasteners 88 extending through the flanges 74, 76 and the external panels 84.

Internal panels 90 are placed against inwardly facing, coplanar surfaces 92 on the bases 68 of the stiffeners/side posts 66. Mechanical fasteners 94 are directed through the internal panels 90 and bases 68 to secure the connection between the internal panels 90 and the stiffeners/side panels 66.

In FIG. 4, an optional scuff liner panel 96 is connected at the bottom of the stiffeners/side posts 66. The scuff liner panel 96 is shown as a corrugated panel with alternating ridges 98 and grooves 100, with lengths that extend generally horizontally. The ridges 98 guide cargo that is advanced thereagainst horizontally within the cargo space bounded by the side wall 60. The corrugated construction also resists damage due to impact as cargo is maneuvered within the space bounded by the side wall 60 as by fork lift trucks, or other mechanisms/vehicles. Mechanical fasteners 102 are directed through the scuff liner panel 96 between ridges 98 and into the stiffeners/side posts 66 to maintain a connection therebetween.

Figure 7:
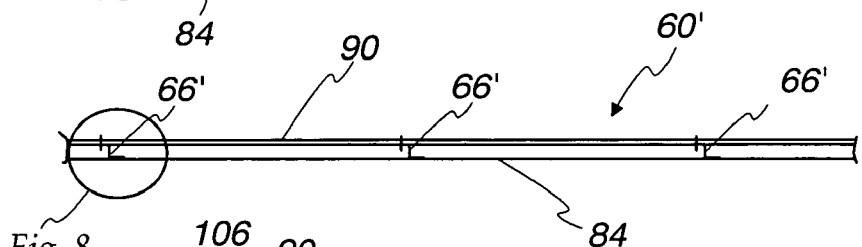
FIG. 7 is a view as in FIG. 5 and showing another form of a conventional side wall.
Figure 8:
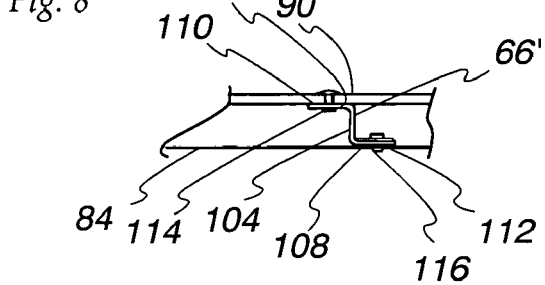
FIG. 8 is a view as in FIG. 6 showing the connection of one of the stiffeners/side posts to internal and external panels on the side wall in FIG. 7.

In FIGS. 7 and 8, another conventional stiffener/side post configuration is shown at 66'. The stiffeners/side posts 66' are generally "Z"-shaped with a stem 104 and internal and external legs 106, 108, projecting oppositely away from the stem 104. The legs 106, 108 have oppositely facing, parallel, flat surfaces 110, 112 to which the aforementioned internal and external panels 90, 84, respectively, can abut. Mechanical fasteners 114 extend through the legs 106 and internal panels 90 to secure the same. Mechanical fasteners 116 extend through the legs 108 and the external panels 84 to secure the connection thereof.

Figure 9:
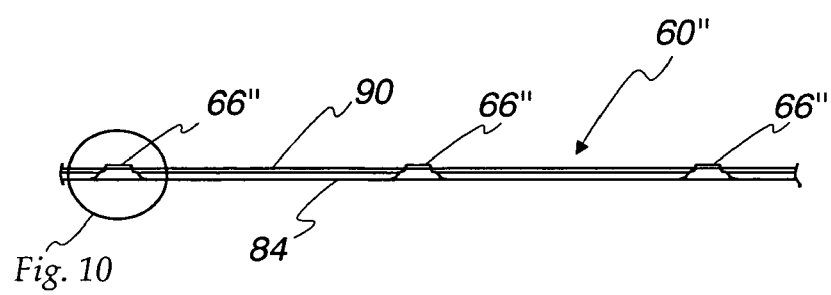
FIG. 9 is a view as in FIGS. 5 and 7 of a another form of a conventional side wall.
Figure 10:
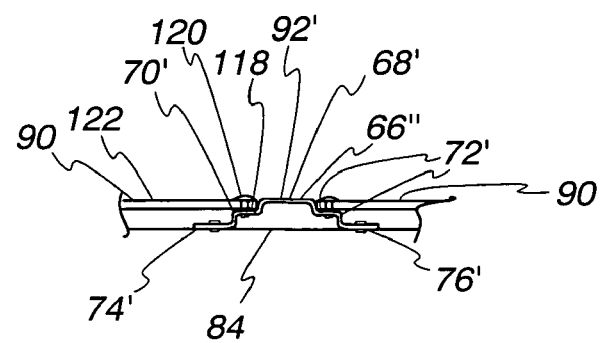
FIG. 10 is a view as in FIGS. 6 and 8 showing the connection of one of the stiffeners/side posts to internal and external panels on the side wall of FIG. 9.

In FIGS. 9 and 10, a further modified form of conventional stiffener/side post is shown at 66" on a side wall 60". The stiffeners/side posts 66" each have a U-shaped configuration, similar to the stiffeners/side posts 66, with a base 68' and legs 70', 72', projecting from the base 66' and blending into bent, oppositely projecting flanges 74', 76'. The primary difference in this design is that the legs 72', 74' are each Z-shaped rather than extending in a straight manner between the base 66' and flanges 74', 76'. Referring to exemplary leg 70, this Z-shaped configuration produces a flat mounting surface 118 that is offset outwardly from the base 68'. The mounting surface 118 provides a seat for an internal panel 90 which is secured thereagainst, as by mechanical fasteners 120. An internal panel 90 is mounted in similar fashion at the other leg 72'. Preferably, the degree of offset of the mounting surface 118 is selected so that, with the internal panel 90 in place, the inside surface 122 on the internal panel 90 is substantially flush with the base surface 92' on the stiffener/side post 66".

Figure 11:
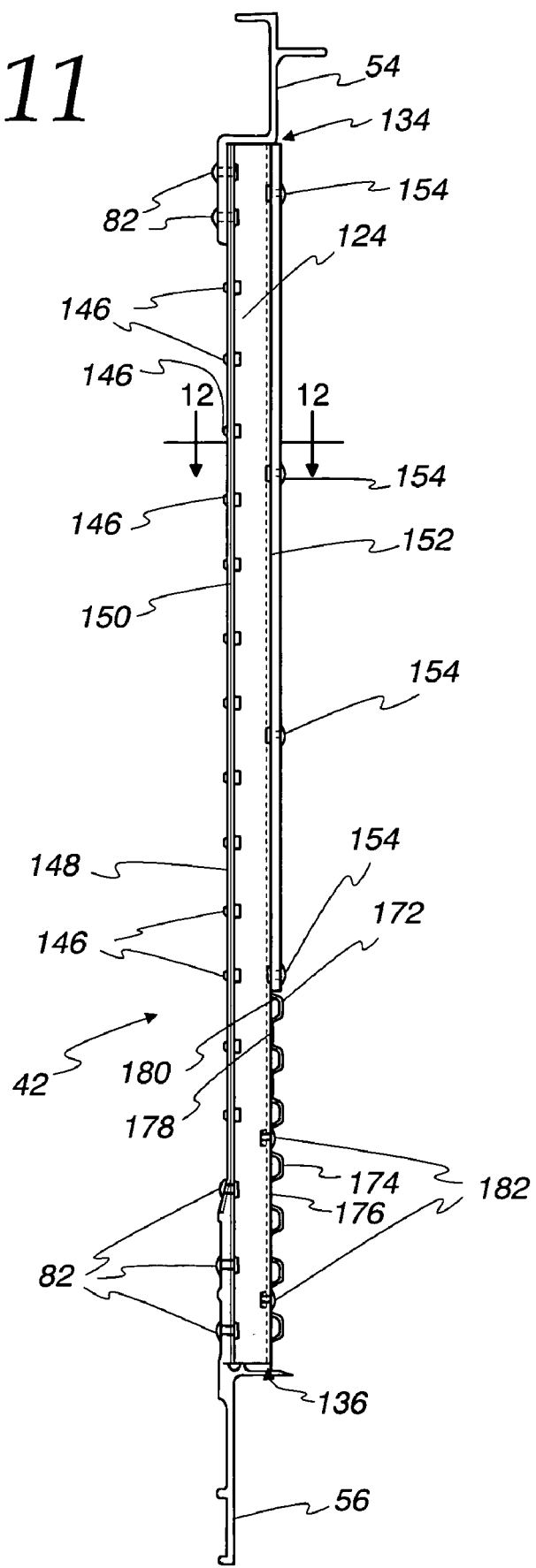
FIG. 11 is an enlarged, cross-sectional view of the semi-trailer/van side wall taken along line 11—11 of FIG. 1.

Referring now to FIGS. 11–13, a preferred form of the invention is shown for the construction of the side wall 42. The side wall 42 consists of at least one corrugated sheet 124 which has alternating internal ridges 126 and grooves 128 which define complementary external ridges 130 and grooves 132. The ridges 126, 130 and grooves 128, 132 have lengths extending between the top 134 and bottom 136 of the side wall 42 for connection to the top and bottom rail assemblies 54, 56, using the aforementioned fasteners 82. In one form, one continuous corrugated sheet extends the full fore-and-aft extent of the side wall 42, as shown on the corresponding side wall 42' in FIG. 22, and described hereinafter. Alternatively, as shown in FIGS. 12 and 13, multiple corrugated sheets are used on the side wall 42.

As seen most clearly in FIG. 13, a first corrugated sheet 138 is joined to a second corrugated sheet 140 to define at least a part of the side wall 42. In this particular embodiment, the first corrugated sheet 138 has an edge portion 142 which overlaps an edge portion 144 on the second corrugated sheet 140 at a joint 145. Mechanical fasteners 146 are extended through the overlapped edge portions 142, 144 to maintain the same together as well as to connect the corrugated sheets 138, 140 to an external panel 148. The trapezoidal shape of the external ridges 130 defines externally facing, coplanar, flat surfaces 150 on the external ridges 130 which facially abut the external panels 148. The underlying edge portion 144 on the second corrugated sheet 140 at the joint 145 likewise facially abuts to the external panel 148 to facilitate its attachment. Mechanical fasteners 146 are placed at regularly spaced intervals, which can be selected depending upon the degree of rigidity required for the side wall 42. Likewise, the fasteners 146 could potentially be installed at every external ridge 130 or at every second, third, fourth, etc. external ridge 130, as strength requirements dictate. The horizontal spacing of the fasteners 146 is also dictated by the horizontal dimensions of the ridges 126, 130.

The unitized corrugated sheets 138, 140 and external panels 148 obviate the requirement for conventional stiffeners/side posts. However, the invention contemplates that additional rigidity may be incorporated by some other type of reinforcement, including, but not limited to that described hereinbelow.

In an exemplary construction, the corrugated sheets 138, 140 are made from steel having a thickness on the order of 0.032 inch. Of course the selection of the particular material is a design consideration, as is its thickness, with that described above being merely exemplary. Considerably thicker or thinner materials are contemplated. An exemplary thickness T (FIG. 12) for the corrugations on the sheets 138, 140 may be on the order of 1". This dimension may vary from, for example, ¼ inches to 1½ inches, and may be lesser or greater than the limits of this range, as a particular application dictates. One preferred thickness (T) is ⅜ inch.

The nature of the internal ridges 126 is such that they will normally deflect impact from cargo directed thereagainst, without inflicting any damage to either the cargo or the side wall 42. Alternatively, as shown in FIG. 14, internal panels 152 may be secured as by fasteners 154 to inwardly facing surfaces 156 on the internal ridges 126 on the corrugated sheets 138, 140. The internal panels 152 may be joined edge-to-edge to produce a continuous planar surface along the inside of the side wall 42.

Figure 15:
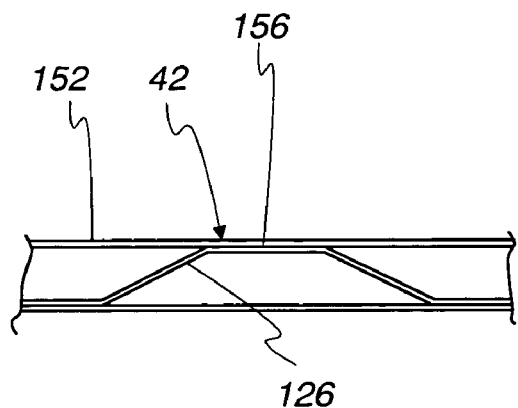
FIG. 15 is a view as in FIG. 14 with the internal panels and external panels connected to the corrugated sheets using an adhesive.

As shown in FIG. 15, as an alternative to using the fasteners 154, the internal panels 152 may be adhesively bonded to the inwardly facing surfaces 156 on the internal ridges 126.

The use of the internal panels 152 adds another degree of rigidity to the side wall 42 and potentially creates an uninterrupted planar surface on the inside of the side wall 42.

Figure 16:
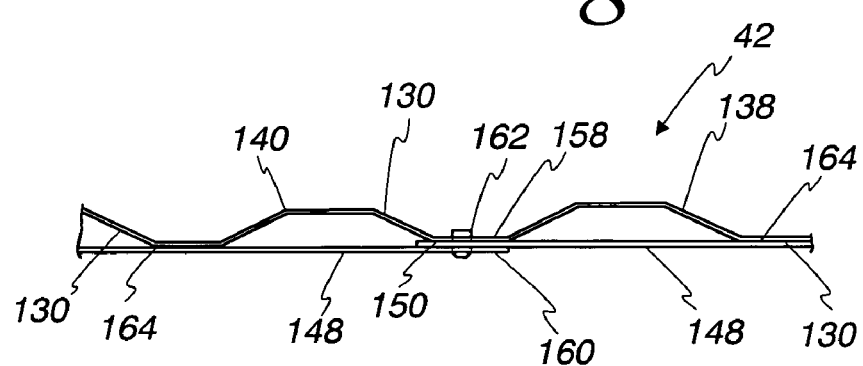
FIG. 16 is a view as in FIGS. 13–15 and showing one form of connecting edge portions on external panels to each other and the corrugated sheets using mechanical fasteners.

In FIG. 16, another variation of the inventive structure is shown wherein the entire exposed outside surface of the side wall 42 may be defined by multiple external panels 148 with edge portions 158, 160 that are overlapped and secured to each other and the flat surfaces 150 of an external ridge 130 by fasteners 162. Alternatively, the external panels 148 may be joined edge-to-edge, with the free edges extending parallel to the lengths of the ridges 126, 130 and grooves 128, 132 to allow the joined free edges to abut along their entire length to an external ridge 130. The lengths of the free edges could, of course be oriented to be at an angle to the lengths of the ridges 126, 130 and grooves 128, 132.

In FIG. 16, the panels 148 are shown connected to the corrugated sheets 138, 140 through the combination of mechanical fasteners 162 and an adhesive layer at 164. In this embodiment, the external ridges 130 on the fore-and-aft side of the overlapped edge portions 158, 160 are bonded to the external panels 148 through the adhesive layer 164.

Figure 17:
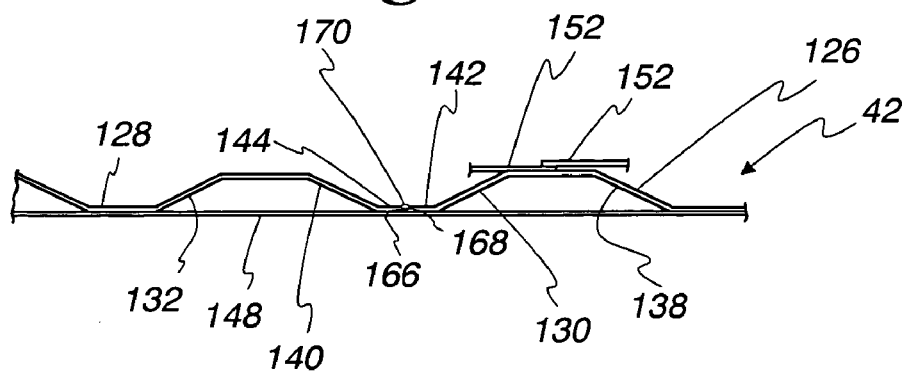
FIG. 17 is a view as in FIGS. 13–16 and showing an alternative arrangement for connecting edge portions of corrugated sheets to each other and external panels and internal panels to the corrugated sheets.

In FIG. 17, another modification is shown for the side wall 42. In this embodiment, the first corrugated sheet 138 has a free edge 166 on the edge portion 142 which extends substantially parallel to the length of the ridges 126, 130 and grooves 128, 132. The second corrugated sheet 140 has a second free edge 168 on the edge portion 144 which likewise extends generally parallel to the length of the ridges 126, 130 and grooves 128, 132. In this embodiment, the free edges 166, 168 are abutted together and joined, as by a weld 170. Fasteners and/or adhesive can be used to bond the external ridge having the butt-joined free edges 166, 168 to an external panel 148.

In FIG. 17, multiple internal panels 152 are shown overlapped at an internal ridge 126. The panels 152 can be joined to each other and the internal ridge 126 to which they abut by an adhesive and/or mechanical fasteners.

In FIG. 11, an optional scuff panel 172 is provided with a corrugated construction with alternating internal ridges 174 and grooves 176 and external ridges 178 and external grooves 180. The ridges 174, 178 and grooves 176, 180 have lengths which extend substantially horizontally. Mechanical fasteners 182 can be extended through external ridges 178 on the scuff panel 172 and into internal ridges 126 on the corrugated sheets 138, 140. The scuff panel 172 avoids damage from impacts to the inside of the side wall 42, as may be imparted by loading vehicles, such as a fork lift. Additionally, the internal ridges 174 act as guides as the cargo is slid thereagainst in a fore-and-aft direction within the cargo storage space 42 in use.

A further modification of the sidewall 42, according to the present invention, is shown in FIG. 18. In FIG. 18, a reinforcing plate 184 is bonded, as by welding or an adhesive, to an internal ridge 126 on the corrugated sheets 138, 140. In this particular embodiment, the reinforcing plate 184 has bent edges 186, 188 which wrap around the inwardly facing surface 156 of the internal ridge 126. A suitable slot/opening 190 can be formed through the double thickness of the corrugated sheets 138, 140 and the reinforcing plate 184, as by a stamping operation. These slots/openings 190 accommodate cargo control devices 192 which may be utilized in conventional fashion to maintain cargo within the cargo storage space 52 in a desired location. The slots/openings 190 can be provided at virtually any location, at any height, and in any pattern as dictated by user requirements.

As shown in FIG. 19, a reinforcing plate 194 may be added from within an external groove 132 on the corrugated sheets 138, 140 to serve the same reinforcing function. A slot/opening 190 can be provided at single or multiple locations as desired, through the combined thickness of the reinforcing plate 194 and corrugated sheets 138, 140.

In FIG. 20, a cargo control device 192 is accommodated by incorporating an adaptor 196, in this case a plate which is welded to adjacent ridges 126. The adaptor 196 may have a different width than shown to reside at different depths within the internal groove 128 between the internal ridges 126 which it spans and to which it is connected. Slots/openings 190 can be provided as described above.

As shown in FIG. 21, another form of adaptor 198 may be optionally mounted. The adaptor 198 has a U-shaped construction with a base 200 and legs 202, 204 projecting away from the base 200. The legs 202, 204 can nest in an internal groove 128 in such a manner that the legs 202, 204 abut, and are connected to, adjacent internal ridges 126. The width of the base 200 and length of the legs 202, 204 are selected so that preferably the base 200 does not extend inwardly beyond the surfaces 150 of the internal ridges 126. Alternatively, however, the base 200 could be dimensioned so that the legs reside fully between, and do not contact, adjacent internal ridges 126. The base 200 has a slot(s)/opening(s) 190, as hereinabove described to accommodate a cargo control device 192.

Figure 22:
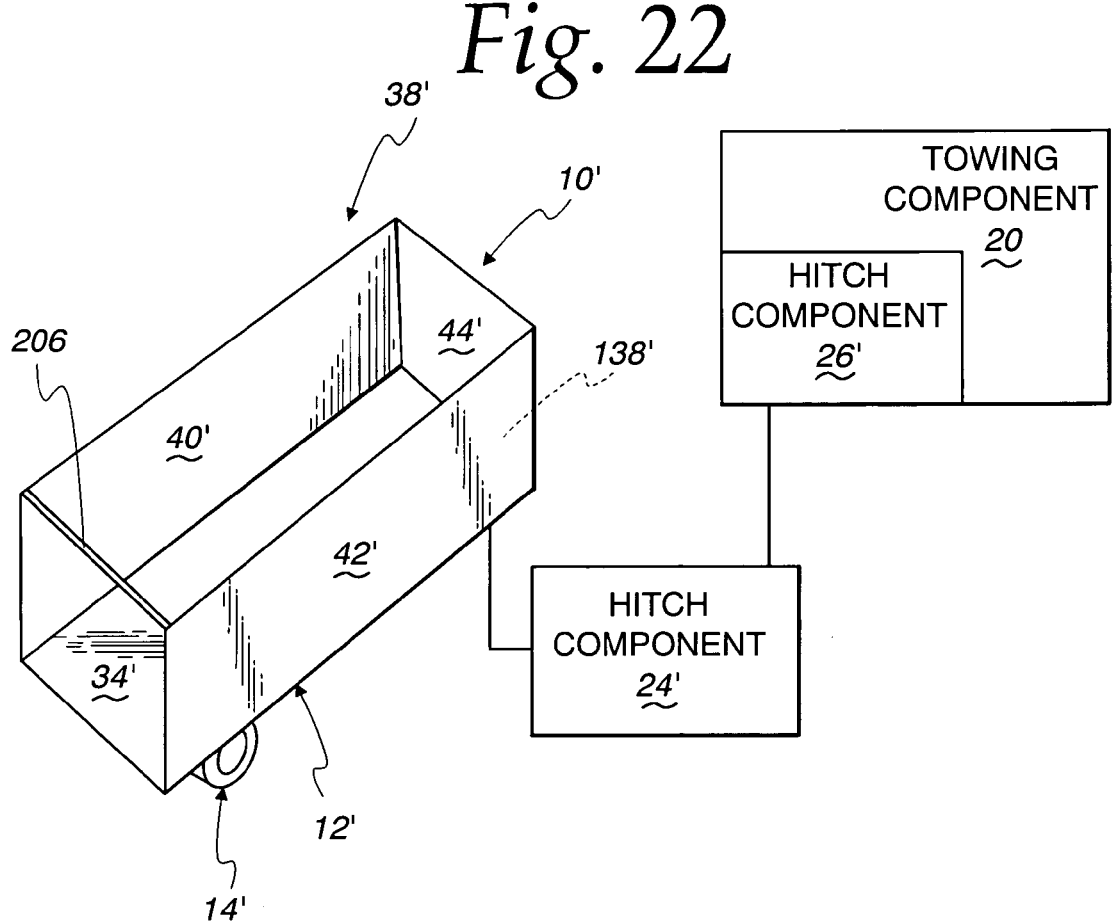
FIG. 22 is a partially schematic representation of a semi-trailer/van with a modified form of cargo container, according to the present invention and connected to a towing component depicted in schematic form.

Another variation of the invention is shown in FIG. 22, wherein a cargo container 10', according to the present invention, incorporates only a floor assembly 34', side walls 40', 42' and a front wall 44'. As previously noted, a peripheral wall assembly 38', consisting of the side wall 40', side wall 42', and front wall 44', may be formed by one continuous corrugated sheet 138'. Given the absence of the roof assembly 136, the back region of the side walls 40', 42' may be bridged and reinforced by a rail assembly 206, for purposes of stability. The cargo container 10' is joined with a chassis 12' having a wheeled carriage 14' including a hitch component 24' which cooperate with a hitch component 26' on the towing component 20.

Figure 23:
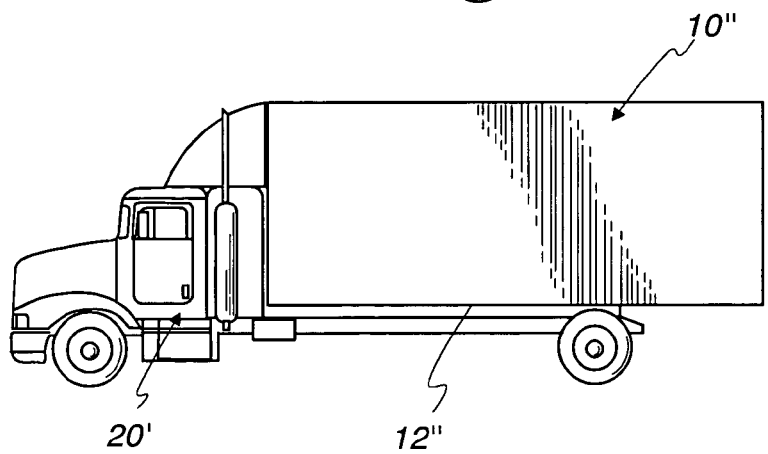
FIG. 23 is a side elevation view of an alternative type of vehicle to the semi-trailer/van shown in FIGS. 1, 2 and 22 permanently integrated with a cargo container, according to the present invention.

In another form of the invention, shown in FIG. 23, a towing component 20' is shown with a chassis 12" that is fixedly connected to a cargo container 10", that is made in the same manner as either the cargo container 10 or the cargo container 10'.

Figure 24:
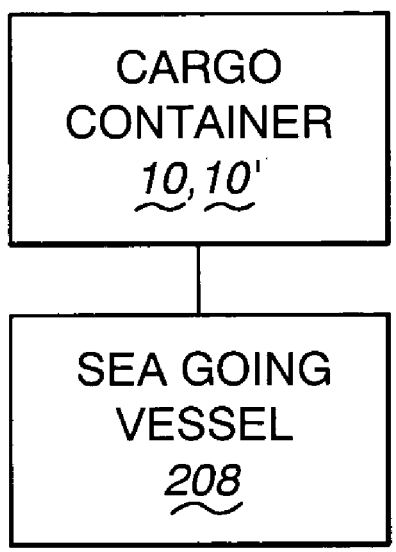
FIG. 24 is a schematic representation of the inventive cargo container on a sea going vessel.
Figure 25:
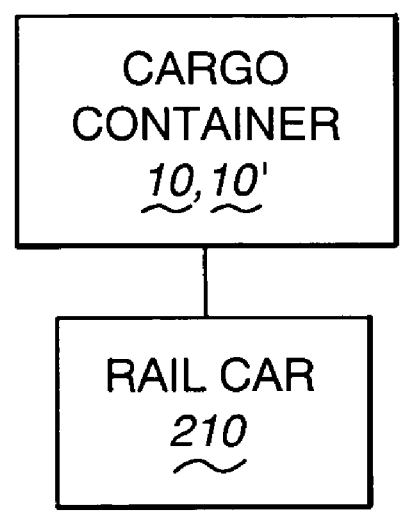
FIG. 25 is a schematic representation of the inventive cargo container on a rail car.
Figure 26:
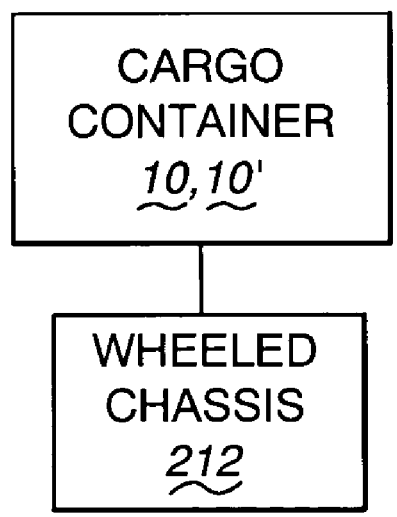
FIG. 26 is a schematic representation of an inventive cargo container on a wheeled chassis.

As shown in FIGS. 24–26, the inventive cargo container 10, 10' may be made for multi-modal use. As shown in FIG. 24, the cargo container 10, 10' may be transported via a sea going vessel 208. As shown in FIG. 25, the cargo container 10, 10' is transported via a rail car 210. In FIG. 26, the cargo contained 10, 10' is shown on a wheeled chassis 212, for over-the-road application. The chassis 212 is intended to encompass the chassis, 12', 12", shown above, and any other type of chassis known to those skilled in this art.

The construction of the cargo container 10, 10', 10" lends itself to a relatively low cost, light weight construction, typical of the conventional constructions which use externally exposed corrugated sheets, typical of the design transported on ocean going vessels. At the same time, a smooth, aerodynamically efficient, aesthetically pleasing exterior for the cargo container 10, 10', 10" can be produced.

The exposed external panels 148 may be made from any of a number of different materials, with a range of different thicknesses. As just one example, the external panels 148 may be made from an aluminum material. The external panels provide an exposed surface that can be painted and/or adorned in the same manner as conventional cargo containers are utilizing the stiffeners/side posts, as previously described.

The corrugated sheets 138, 140, united with the external panels 148, and optionally the internal panels 152, potentially produce a high strength construction of a relatively small thickness. Aside from the structural strength that results, the durability of the steel, or other metal, in conjunction with the trapezoidal shape of the internal and external ridges 126, 130, deflects impacts and is not prone to snagging cargo that is moved thereagainst in a fore-and-aft direction. Thus, the use of the internal panels 152, while a viable option, is not required.

In the absence of the internal panels 152, the internal ridges 126 lend themselves to the application of plates 184, 194 and adaptors 196, 198 to facilitate the securement of cargo through conventional control devices.

A desired strength of the side wall 42 can be achieved by selecting the depth of the ridges 126, 130, the thickness of the material defining the corrugated sheets 138, 140, the configuration of the ridges 126, 130 and grooves 128, 132, the width of the ridges 126, 130 and grooves 128, 132, etc. The above design can be made to optimize space and rigidity for a particular application.

The corrugated sheets 138, 140 also lend themselves to the application of a liner 212 (FIG. 20), which may be in sheet or panel form. The liner 212 may be constructed in many different forms, and from many different materials, to perform one or more different functions. As just examples, the liner 212 may: a) act as a filler; b) serve as an insulator; and/or c) perform a reinforcing function.

Figure 27:
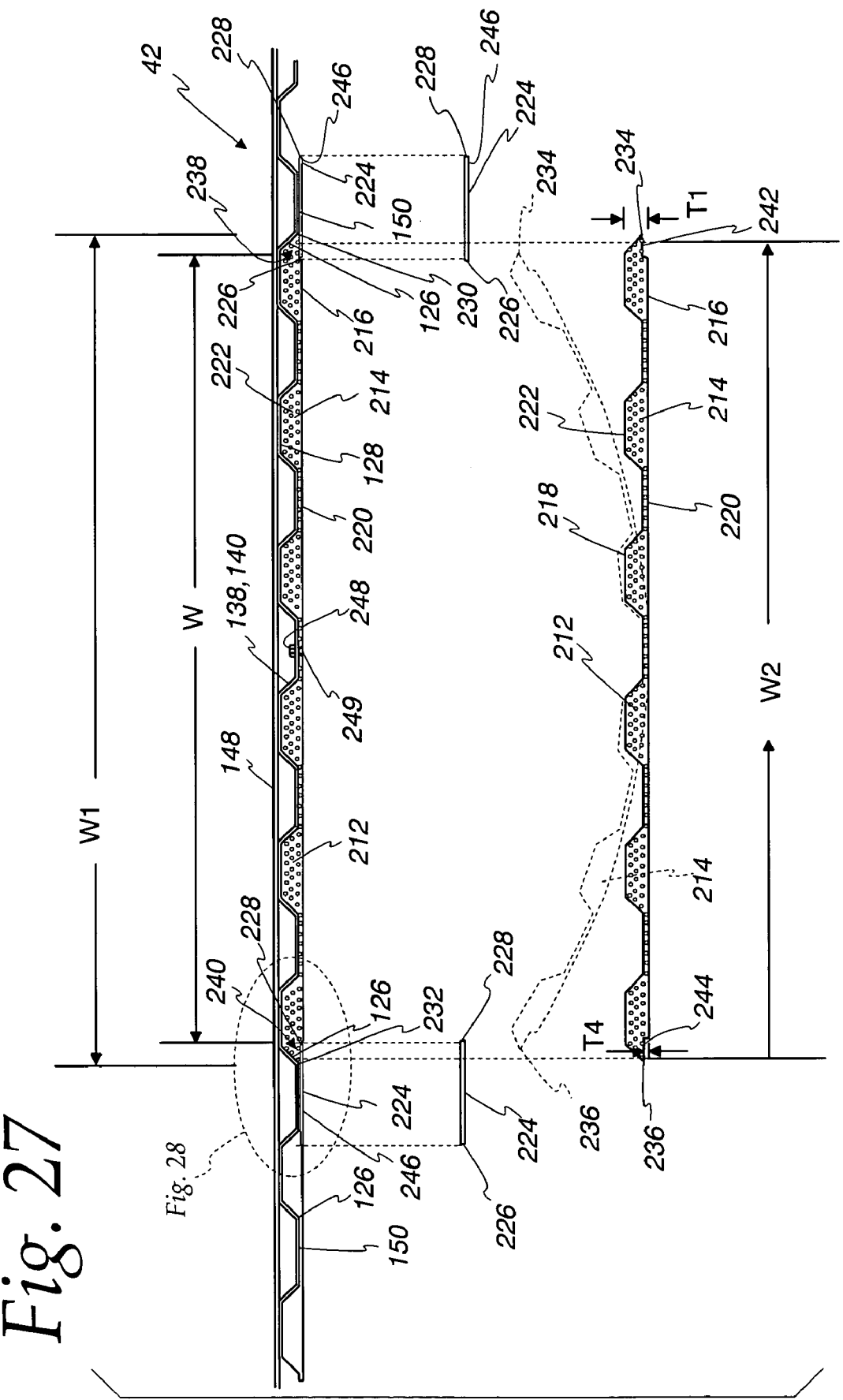
FIG. 27 is a view as in FIG. 12 and incorporating a liner held in place using attachment plates, with the liner and attachment plates shown in both separated and assembled relationship and with the panel shown bowed in a phantom line configuration to facilitate its installation.
Figure 28:
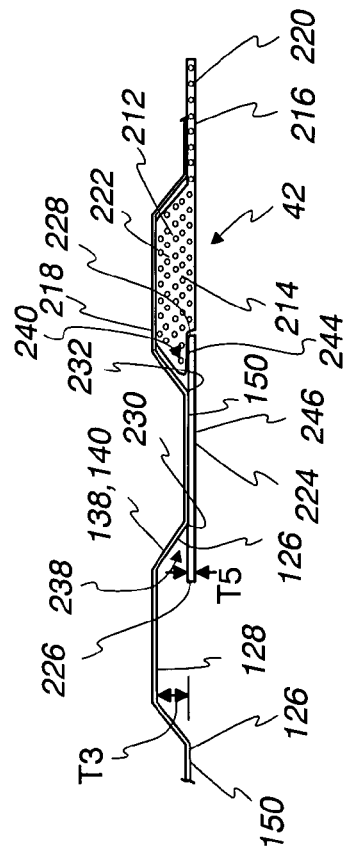
FIG. 28 is an enlarged view of a portion of the side wall, from the perspective of FIG. 27, and showing the connection between one edge of the panel in FIG. 27 and a corrugated sheet(s) at which an attachment plate is provided.

An exemplary liner 212, performing insulating and filler functions, and to a certain extent a reinforcing function, is shown in FIGS. 27 and 28 in association with the side wall 42, defined by the corrugated sheet(s) 138, 140, to which external panels 148 are attached, as previously described. The liner 212 consists of individual panels 214, each of which may extend partially or fully between the top 134 and bottom 136 (FIG. 11) of the side wall 42. Each panel 214 has a planar inside surface 216, and an oppositely facing surface 218 that is contoured to be complementary to the internal grooves 128 defined by the corrugated sheets 138, 140. The thickness T1 (FIG. 27) of each panel 214 is slightly greater than the thickness/depth (T3) (FIG. 28) of the internal grooves 128. This permits bridging portions 220 of the panels 214 to overlie, and facially abut to, the flat, inwardly facing surfaces 150 on the internal ridges 126. Preferably, the panels 214 have ridges 222, which each conform to and completely fill, a complementary internal groove 128. Each panel 214 has a plurality of ridges 222, and in the embodiment shown, six such ridges 222, united into a unitary structure by the bridging portions 220.

To facilitate installation of each panel 214, attachment plates 224 are utilized. The attachment plates 224 are each shown to be substantially flat. The attachment plates 224 are secured, as by welding, adhesive, or otherwise, to spaced, internal ridges 126. The attachment plates 224 abut to the flat surfaces 150 on the internal ridges 126 and project in both fore-and-aft directions beyond the horizontal width dimension of the surfaces 150 on the internal ridges 126. As seen in FIG. 27, with this arrangement, facing edges 226, 228 on adjacent attachment plates 224 are spaced by a dimension W, which is less than the spacing W1 between edges 230, 232 on the flat surfaces 150 on the internal ridges 126 to which adjacent attachment plates 224 are secured.

The panels 214 each have a width W2 that is slightly less than the width W1, but significantly greater than the width W. As a result, panel edges 234, 236 can be pressed respectively into receptacles 238, 240 defined cooperatively by, and between, the attachment plates 224 and the corrugated sheets 138, 140.

To effect installation, each panel 214 is bowed, as shown in dotted lines in FIG. 27, to reduce the effective width thereof to allow the panel edges 234, 236 to be directed into the receptacles 238, 240. This can be done in one of at least two different ways. In one procedure, the panel edge 236 is introduced to the receptacle 240 with the panel 214 in its substantially undeformed state. Once the panel edge 236 is partially seated in the receptacle 240, the panel 214 is bowed to allow the other panel edge 234 to clear the attachment plate edge 226 to be directed into the receptacle 238. By thereafter releasing the deforming force on the panel 214, the panel 214 springs back towards its undeformed state, whereupon the panel edges 234, 236 move fully into their respective receptacles 238, 240 and the panel 214 reassumes its flattened state.

Alternatively, the panel 214 can be bowed, prior to engagement with the corrugated sheets 138, 140, whereby its effective width is reduced to the width W. This allows the panel edges 234, 236 to be simultaneously presented at the receptacles 238, 240. By then releasing the deforming force on the panel 214, the panel 214 will spring back towards its undeformed state, thereby causing the panel edges 234, 236 to seat in the receptacles 238, 240 and allowing the remainder of the panel 214 to reassume its flattened state.

Each panel 214 is undercut to define offset edges 242, 244 adjacent to the panel edges 234, 236, respectively. The depth T4 (FIG. 27) of each undercut is approximately equal to the thickness T5 (FIG. 28) of each attachment plate 224. This allows the inside panel surfaces 216 to be aligned flushly, i.e. in coplanar relationship with, flat inside surfaces 246 on the attachment plates 224 so that there is a substantially uninterrupted, planar surface expanse defined cooperatively by the inside surface 216 of each panel 214 and inside surfaces 246 of the attachment plates 224.

To avoid bowing of the installed panels 214 due primarily to there being a residual deforming force therein, mechanical fasteners 248 may be installed to secure the bridging portions 220 of the panels 214 to the internal ridges 126. The horizontal and vertical spacing of the mechanical fasteners 248 can be selected based on the particular design requirements, taking into consideration the characteristics of the material defining the panels 214. Adhesive may be used in place of, or in conjunction with, the fasteners 248, to secure the panels 214 in place. The mechanical fasteners 248 may have countersunk heads 249 so as to avoid the presence of exposed protrusions projecting internally from the plane of the surfaces 216, 246, as might damage, or interfere with loading and/or unloading of, cargo.

As just one example, the panels 214 may be made form high-density polyethylene material (HDPE), which has good insulating properties. Additionally, the attached panels add a degree of rigidity to the side wall 42.

The panels 214, like the attachment plates 224, can extend either partially, or fully, between the top 134 and bottom 136 of the side wall 42. The width of the panels 214 may vary, but is preferably sufficient to define at least two ridges 22 connected by a bridging portion 220. As just one example, the panels 214 may be made with a width on the order of two feet. Of course, this dimension is dictated by the width of the internal and external ridges 126, 130 and internal and external grooves 128, 132 on the corrugated sheets 138, 140.

Figure 29:
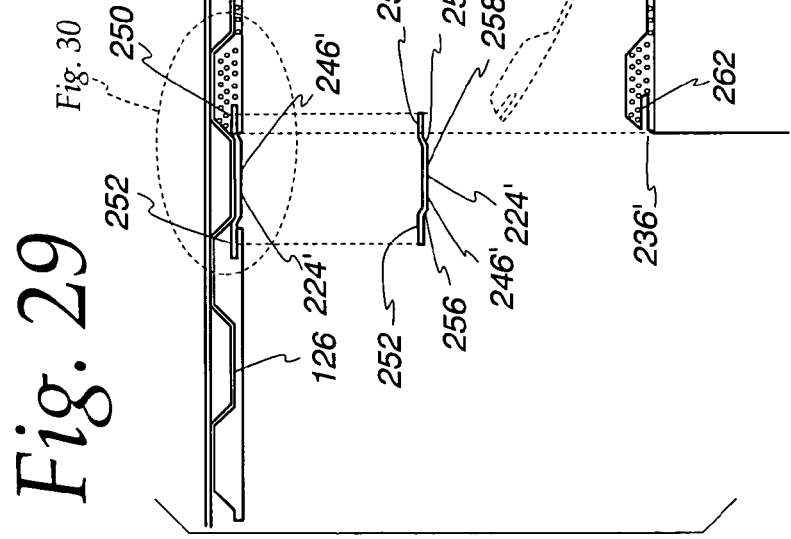
FIG. 29 is a view as in FIG. 27 with a modified form of panel and attachment plate, according to the present invention.

In FIGS. 29 and 30, a modified form of liner 212' is shown incorporated into the side wall 42. The liner 212' is defined by panels 214' similarly constructed to the panels 214. The panels 214' are maintained in place by attachment plates 224', corresponding to the attachment plates 224, previously described. The attachment plates 224' differ from the attachment plates 224 by reason of the attachment plates 224' each having offset edge portions 250, 252 as opposed to the flat shape of the attachment plates 224 over their entire, internal, areal extent. Transition portions 254, 256 on each attachment plate 224' connect between a base portion 258 and the edge portions 250, 252. The edge portions 250, 252 are offset a distance T5 from the inside surface 246' of the base portion 258 (FIG. 30). The base portion 258 and edge portions 250, 252 conformingly engage a portion of the internal ridges 126 to which they attach.

The panels 214' have the same construction as the panels 214 with the exception that slots 260, 262 are formed at the edges 234', 236' to produce a bifurcated shape at each panel edge 234', 236'. The slots 260, 262 are dimensioned to each receive one of the offset edge portions 250, 252 on an attachment plate 224'. The panels 214' are configured preferably so that with the panels 214' installed, planar inside surfaces 216' thereon are substantially coplanar with the inside surfaces 246' on the attachment plates 224', to produce a substantially continuous, planar surface over preferably the entire areal expanse of the inside of the side wall 42.

Fasteners 248', with countersunk heads 249', may be utilized to enhance the connection of the panels 214' to the corrugated sheets 138, 140. Alternatively, an adhesive may be used, alone or in conjunction with the fasteners 248, to securely maintain the panels 214' in place.

In FIG. 31, another form of liner, to perform a reinforcing and filler function, is shown at 212" incorporated into the side wall 42. The liner 212" consists of a plurality of panels 214", each of which has a base wall 264, with vertically extending ribs 266 integrally formed with, and projecting from, the base wall 264. The base wall 264 has a planar inside surface 216" and an oppositely facing surface 268 from which the reinforcing ribs 266 project.

The reinforcing ribs 266 are elongate with a generally T-shaped construction, each including a stem 270 and a cross bar 272 with a flat, inwardly facing surface 274, at its innermost portion. The lengths of the reinforcing ribs 266 are substantially parallel and vertically aligned.

The reinforcing ribs 266 are provided in groups of two adjacent to the panel edges 234", 236", and elsewhere on each panel 214" in groups of three. The spacing between the groups of reinforcing ribs 266 is selected so that with the panel 214" operatively installed, the groups of reinforcing ribs 266 each reside fully within an internal groove 128 on the corrugated sheets 138, 140.

The reinforcing ribs 266 are dimensioned so that with the panels 214" operatively installed, the flat surfaces 274 simultaneously abut an inwardly facing surface 276, at the base of each internal groove 128, as the surface 268 of the base wall 264 abuts to the flat surfaces 150 on the internal ridges 126.

The panels 214" are maintained in place utilizing the attachment plates 224', previously discussed, or a similar type of attachment plate. The offset edge portions 250, 252 on the attachment plates 224' respectively define mounting surfaces 278, 280, offset from the inside surface 246' of the base portion 258 by the thickness T5 (FIG. 30) that is approximately equal to the thickness T6 (FIG. 31) of the base wall 264 on the panel 214". Accordingly, with the panel 214" operatively connected to the corrugated sheets 138, 140, the inside panel surface 216" will be substantially flush with the inside surface 246' of the attachment plates 224', so that a continuous, planar, inside surface is defined on the side wall 42.

Fasteners 282, with recessed heads 283, may be directed through the panel 214" and the opposite edge portions 250, 252 on the attachment plates 224' adjacent to the edges 236", 234", respectively, on the panel 214". Additional fasteners 284 and/or an adhesive may be used within the edges 234", 236" to further secure the connection of the liner 212" to the corrugated sheets 138, 140.

Each panel 214" may extend partially or fully between the top 134 and bottom 136 of the side wall 42. An exemplary panel width (W3) may be on the order of two feet. However, all dimensions will be in part dictated by the particular configuration of the corrugated sheets 138, 140 and the particular application for which the side wall 42 is intended. The nature of the material defining the panels 214" again is dictated at least in part by the particular application for the cargo container 10, 10' incorporating the side wall 42.

Figure 32:
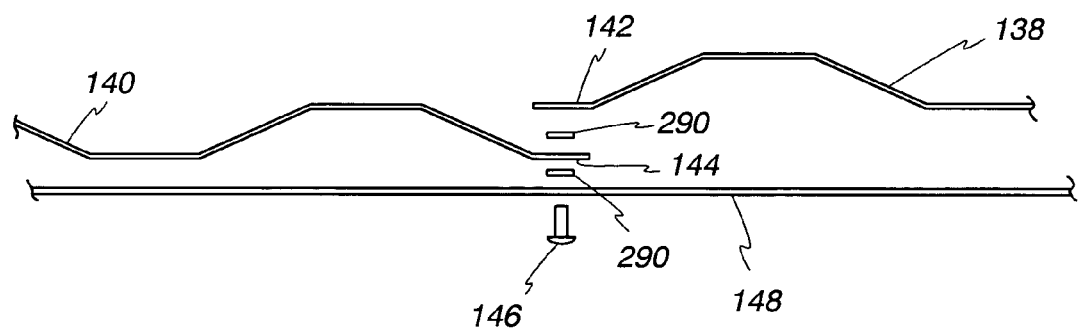
FIG. 32 is a view as in FIG. 13 with the parts exploded and showing a sealing layer interposed between facing surfaces that are drawn together with the corrugated sheets and external panel connected.

Many other variations of the invention, not specifically discussed herein, are contemplated. As just one example, to prevent moisture migration between points of connection between the corrugated sheets 138, 140 and the connection between the corrugated sheets 138, 140 and external panels 148, and internal panels 152, sealing layers 290 may be utilized, as shown in FIG. 32. In FIG. 32, the sealing layer is defined by a combined sealing and di-electric tape. At the exemplary connection shown in FIG. 32, one layer of the di-electric tape 290 is disposed between the edge portions 142, 144 on adjacent, joined, corrugated sheets 138, 140. A separate layer of the di-electric tape 290 is disposed between the edge portion 144 and the external panel 148. By securing a fastener 146, the di-electric tape 290 is compressed captively in place to seal between the surfaces with which it is engaged. The di-electric tape, or other suitable sealing layer, can be utilized at any, or all, of the other like points of connection on the side wall 42.

The foregoing disclosure of specific embodiments is intended to be illustrative of the broad concepts comprehended by the invention.

What is claimed is:

1. A cargo container comprising:
   a floor;
   a front wall; and
   spaced side walls,
   the floor, front wall and side walls cooperatively bound a cargo storage space,
   the front and spaced side walls each having an exposed inside surface bounding the cargo storage space and an exposed outside surface with an area,
   the front and spaced side walls cooperatively defining a peripheral wall structure having a top and bottom,
   at least part of the peripheral wall structure comprising at least one corrugated sheet having a plurality of alternating ridges and grooves,
   the ridges and grooves having lengths extending in a direction between the top and bottom of the peripheral wall structure,
   the at least part of the peripheral wall structure comprising at least one external panel that is connected to the at least one corrugated sheet so as to define a substantial area of the exposed outside surface,
   wherein the alternating ridges and grooves comprise alternating internal ridges and grooves and alternating external ridges and grooves, and the at least one external panel bridges a plurality of external ridges and is connected to a plurality of the external ridges,
   wherein the at least one external panel extends over a majority of the area of at least one of the spaced side walls,
   the at least one external panel having a substantially flat shape defining the exposed outside surface over the majority of the area of the at least one of the spaced side walls.

2. The cargo container according to claim 1 wherein the at least one corrugated sheet extends over substantially the entire extent of the at least one of the spaced side walls and the at least one external panel is connected to the at least one corrugated sheet to define substantially the entire exposed outside surface on the at least one of the spaced side walls.

3. The cargo container according to claim 2 wherein the at least one external panel defines a substantially continuous planar shape over substantially the entire exposed outside surface on the at least one of the spaced side walls.

4. The cargo container according to claim 1 wherein the at least one corrugated sheet extends substantially fully between the top and bottom of the peripheral wall structure.

5. The cargo container according to claim 1 wherein the at least one external panel is connected to the at least one corrugated sheet through mechanical fasteners.

6. The cargo container according to claim 1 wherein the cargo container comprises a top rail assembly at the top of the peripheral wall structure and a bottom rail assembly at a juncture between the floor and the peripheral wall structure, and the at least one corrugated sheet extends between and is connected to each of the top rail assembly and the bottom rail assembly.

7. The cargo container according to claim 1 wherein the at least part of the peripheral wall comprises first and second corrugated sheets having alternating ridges and grooves, the first corrugated sheet having a first edge portion with a first free edge extending generally parallel to the lengths of the ridges and grooves, the second corrugated sheet having a second edge portion with a second free edge extending generally parallel to the lengths of the ridges and grooves, and the first and second edge portions are overlapped.

8. The cargo container according to claim 1 wherein the at least part of the peripheral wall structure comprises first and second external panels connected to the at least one corrugated sheet so as to each define a part of the exposed outside surface, the first external panel has a first edge portion with a first free edge extending generally parallel to the lengths of the ridges and grooves, the second external panel has a second edge portion with a second free edge extending generally parallel to the lengths of the ridges and grooves, and the first and second edge portions are overlapped.

9. The cargo container according to claim 8 wherein the alternating external ridges and external grooves and the overlapped first and second edge portions overlie an external ridge.

10. The cargo container according to claim 1 wherein the at last one corrugated sheet comprises steel.

11. The cargo container according to claim 1 wherein the at least one corrugated sheet has a thickness between ¼ inch and 1½ inches.

12. The cargo container according to claim 1 wherein the at least part of the peripheral wall structure comprises first and second corrugated sheets having alternating ridges and grooves, and the first and second corrugated sheets are connected so that a ridge on the first corrugated sheet overlaps a ridge on the second corrugated sheet.

13. The cargo container according to claim 1 in combination with a powered towing component.

14. The cargo container according to claim 13 wherein the powered towing component is releasably connectable to the cargo container.

15. The cargo container according to claim 1 wherein the cargo container comprises a wheeled carriage beneath the floor.

16. The cargo container according to claim 1 wherein the cargo container comprises a roof which spans between the front wall and the spaced side walls.

17. A cargo container comprising:
   a floor;
   a front wall; and
   spaced side walls,
   the floor, front wall and spaced side walls cooperatively bound a cargo storage space,
   the front and spaced side walls each having an exposed inside surface bounding the cargo storage space and an exposed outside surface,
   the front and spaced side walls cooperatively defining a peripheral wall structure having a top and bottom, at least part of the peripheral wall structure comprising at least one corrugated sheet having a plurality of alternating ridges and grooves, the ridges and grooves having lengths extending in a direction between the top and bottom of the peripheral wall structure, the at least part of the peripheral wall structure comprising at least one external panel that is connected to the at least one corrugated sheet so as to define a substantial area of the exposed outside surface, wherein the at least one corrugated sheet extends over substantially the entire extent of at least one of the side walls and the at least one external panel is connected to the at least one corrugated sheet to define substantially the entire exposed outside surface on the one side wall, the at least one external panel having a substantially flat shape defining the exposed outside surface over substantially the entire exposed outside surface on the one side wall.

18. The cargo container according to claim 17 wherein the at least one external panel defines a substantially continuous planar shape over substantially the entire exposed outside surface on the one side wall.

19. A cargo container comprising:

a floor;

a front wall; and spaced side walls, the floor, front wall and spaced side walls cooperatively bound a cargo storage space, the front and spaced side walls each having an exposed inside surface bounding the cargo storage space and an exposed outside surface, the front and spaced side walls cooperatively defining a peripheral wall structure having a plurality of a top and bottom, at least part of the peripheral wall structure comprising at least one corrugated sheet having alternating ridges and grooves, the ridges and grooves having lengths extending in a direction between the top and bottom of the peripheral wall structure, the at least part of the peripheral wall structure comprising at least one external panel that is connected to the at least one corrugated sheet so as to define a substantial area of the exposed outside surface, wherein the at least one corrugated sheet extends over a majority of the extent of at least one of the side walls and the at least one external panel is connected to the at least one corrugated sheet to define a majority of the exposed outside surface on the one side wall, the at least one external panel having a substantially flat shape defining the exposed outside surface over the majority of the exposed outside surface on the one side wall.

\* \* \* \* \*